(12) United States Patent
Kwag

(10) Patent No.: US 9,252,404 B2
(45) Date of Patent: Feb. 2, 2016

(54) RECHARGEABLE BATTERY PACK

(71) Applicant: SAMSUNG SDI CO., LTD., Yongin-si, Gyeonggi-do (KR)

(72) Inventor: No-Hyun Kwag, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/088,801

(22) Filed: Nov. 25, 2013

(65) Prior Publication Data

US 2014/0193684 A1 Jul. 10, 2014

(30) Foreign Application Priority Data

Jan. 9, 2013 (KR) .................. 10-2013-0002546

(51) Int. Cl.
*H01M 2/10* (2006.01)

(52) U.S. Cl.
CPC ............ *H01M 2/1033* (2013.01); *H01M 2/105* (2013.01)

(58) Field of Classification Search
CPC ........................... H01M 2/1033; H01M 2/105
USPC .................................... 429/508, 99
See application file for complete search history.

(56) References Cited

U.S. PATENT DOCUMENTS

| 7,968,222 B2 | 6/2011 | Kang et al. |
| 2007/0148536 A1 | 6/2007 | Kang et al. |

FOREIGN PATENT DOCUMENTS

| JP | 2005-123069 A | 5/2005 |
| KR | 10-2007-0060201 A | 6/2007 |
| WO | WO 2012128484 A2 * | 9/2012 |

OTHER PUBLICATIONS

English translation of WO 2012128484 A2, Bang S H et al., Property Organization (WIPO), Sep. 2012.*

* cited by examiner

*Primary Examiner* — Jonathan Jelsma
*Assistant Examiner* — Rashid Alam
(74) *Attorney, Agent, or Firm* — Lee & Morse, P.C.

(57) ABSTRACT

A rechargeable battery pack includes a rechargeable battery cell, and a pair of cell holders receiving respective sides of the rechargeable battery cell in a length direction, the pair of cell holders being combinable with each other. Each of the cell holders includes a base that supports the rechargeable battery cell, a combination protrusion and a combination groove symmetrically disposed on an outer side of the base, a protrusion protruding from the base in the length direction so as to be combinable in the length direction, and a recess portion being concave in the base in the length direction such that the recess portion of one of the pair of cell holders is combinable with the protrusion of the other of the pair of cell holders.

8 Claims, 14 Drawing Sheets

RECHARGEABLE BATTERY PACK

CROSS-REFERENCE TO RELATED APPLICATION

Korean Patent Application No. 10-2013-0002546 filed in the Korean Intellectual Property Office on Jan. 9, 2013, and entitled: "RECHARGEABLE BATTERY PACK," is incorporated herein by reference in its entirety.

BACKGROUND

1. Field

Embodiments relate generally to a rechargeable battery pack having a cell holder.

2. Description of the Related Art

As technical development of and demand for mobile devices, electric bicycles, electric scooters, and machine tools have increased, the demand for rechargeable batteries as an energy source has also increased. Rechargeable batteries can be used in a rechargeable battery pack configured with a plurality of rechargeable batteries coupled in series or in parallel so as to realize high output.

SUMMARY

Embodiments are directed to a rechargeable battery pack including a rechargeable battery cell and a pair of cell holders that receive respective sides of the rechargeable battery cell in a length direction, the pair of cell holders being combinable with each other. Each of the cell holders includes a base that supports the rechargeable battery cell, a combination protrusion and a combination groove symmetrically disposed on an outer side of the base, a protrusion protruding from the base in the length direction so as to be combinable in the length direction, and a recess portion that is concave in the base in the length direction such that the recess portion of one of the pair of cell holders is combinable with the protrusion of the other of the pair of cell holders.

Each cell holder further may include a support corresponding to an end of the rechargeable battery cell and supporting an end of the rechargeable battery cell in the length direction.

The pair of cell holders may include a first cell holder that receives one side of the rechargeable battery cell in a length direction, and a second cell holder for receiving another side of the rechargeable battery cell in the length direction.

The protrusion and the recess portion of the first cell holder may be symmetrical to each other, and the recess portion and the protrusion of the second cell holder may be symmetrical to each other and combinable with the protrusion and the recess portion of the first cell holder.

The protrusion of each cell holder may include a hook that protrudes to cross the length direction. The recess portion of each cell holder may include a groove that is concave in the length direction.

The protrusion of the first cell holder may include a first protrusion and a second protrusion that are symmetrical to each other. The recess portion of the second cell holder may include a first recess portion and a second recess portion combinable with the first protrusion and the second protrusion, the first recess portion and the second recess portion being symmetrical to each other.

The first protrusion and the first recess portion may have a corresponding first length. The second protrusion and the second recess portion may have a corresponding second length that is less than the first length.

The rechargeable battery cell may have cylindrical shape or a square shape.

Embodiments are also directed to a rechargeable battery pack including a plurality of rechargeable battery cells, and a plurality of cell holders for receiving the rechargeable battery cells, the cell holders being combinable with each other on an outer side. Each of the cell holders includes a base for supporting the rechargeable battery cell, and a combination protrusion and a combination groove symmetrically disposed on an outer side of the base.

The rechargeable battery cell may be a cylindrical rechargeable battery. The base of the cell holder may be in a form of a cylinder corresponding to the cylindrical rechargeable battery.

The combination protrusion may include a first combination protrusion at one side of the base, and a second combination protrusion spaced apart from the first combination protrusion at a predetermined interval.

The first combination protrusion may include a primary first combination protrusion, and a secondary first combination protrusion and a tertiary first combination protrusion on respective sides in a 30-degree direction from the primary first combination protrusion such that the primary first combination protrusion is centered between the secondary first combination protrusion and the tertiary first combination protrusion.

The combination groove may include a first combination groove at the base on an opposite side in a diameter direction from the first combination protrusion, and a second combination groove at the base at an opposite side in a diameter direction from the second combination protrusion.

The first combination groove may include a primary first combination groove, and a secondary first combination groove and a tertiary first combination groove provided on respective sides in the 30-degree direction of the primary first combination groove such that the primary first combination groove is centered between the secondary first combination groove and the tertiary first combination groove.

The combination protrusion may have a first width at a circumferential surface of the base and may include an inclined surface such that a protruded end of the combination protrusion has a second width that is greater than the first width.

The combination groove may have a first width at a surface of the base, the first width of the combination groove corresponding to the first width of the combination protrusion, and includes an inclined surface such that the combination groove has a second width inside the base, the second width of the combination groove corresponding to the second width of the combination protrusion.

The combination protrusion may include a connector that protrudes from the base, the connector having a first width, and an extension at an end of the connector, the extension having a second width that is greater than the first width.

The combination groove may have the first width at the surface of the base to correspond to the connector, and may have the second width inside the base to correspond to the extension.

The combination protrusion may protrude from the base with a first width. The combination groove may be formed into an outer surface of the base with the first width to correspond to the combination protrusion.

With respect to each of the cell holders, the combination protrusion may include a plurality of combination protrusions at regular intervals on one half of a circumference of the base, and the combination groove may include a plurality of combination grooves symmetric with the combination protrusions at regular intervals on another half of the circumference of the base.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
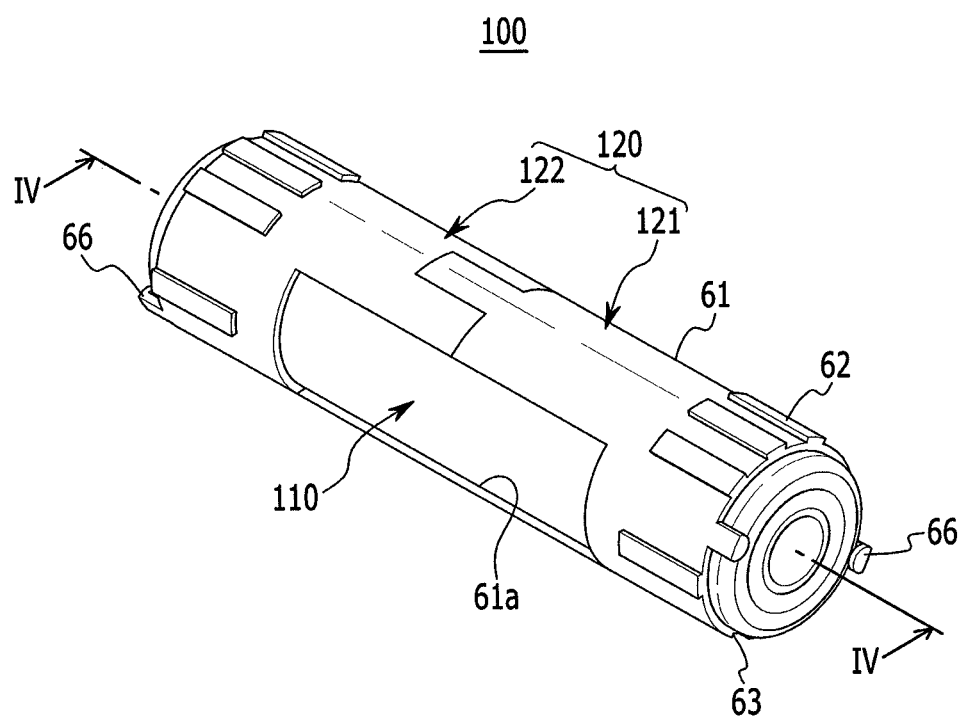
FIG. 1 illustrates a perspective view of a rechargeable battery pack according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of elements may be exaggerated for clarity of illustration. Like reference numerals refer to like elements throughout.

Figure 2:
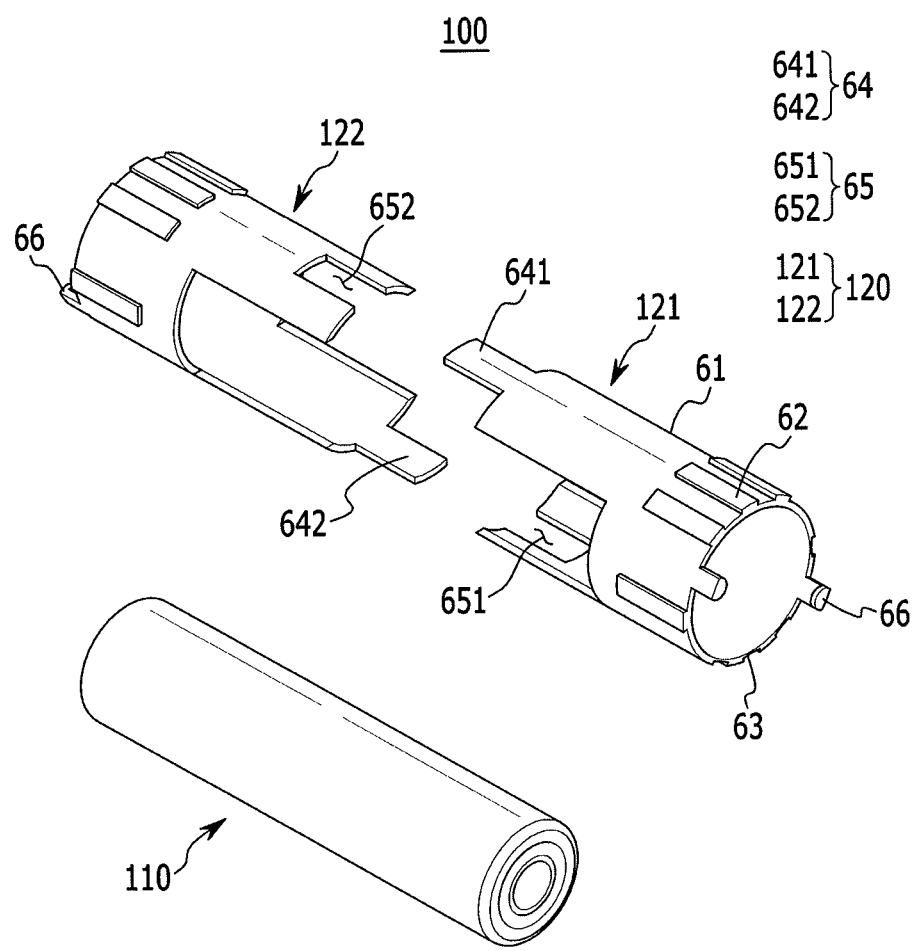
FIG. 2 illustrates an exploded perspective view of a rechargeable battery pack of FIG. 1.

FIG. 1 illustrates a perspective view of a rechargeable battery pack 100 according to an exemplary embodiment, and FIG. 2 illustrates an exploded perspective view of a rechargeable battery pack 100 of FIG. 1. Referring to FIG. 1 and FIG. 2, the rechargeable battery pack 100 includes a rechargeable battery cell 110 and a pair of cell holders 120 receiving both sides of the rechargeable battery cell 110 in a length direction and combined with each other.

Figure 3:
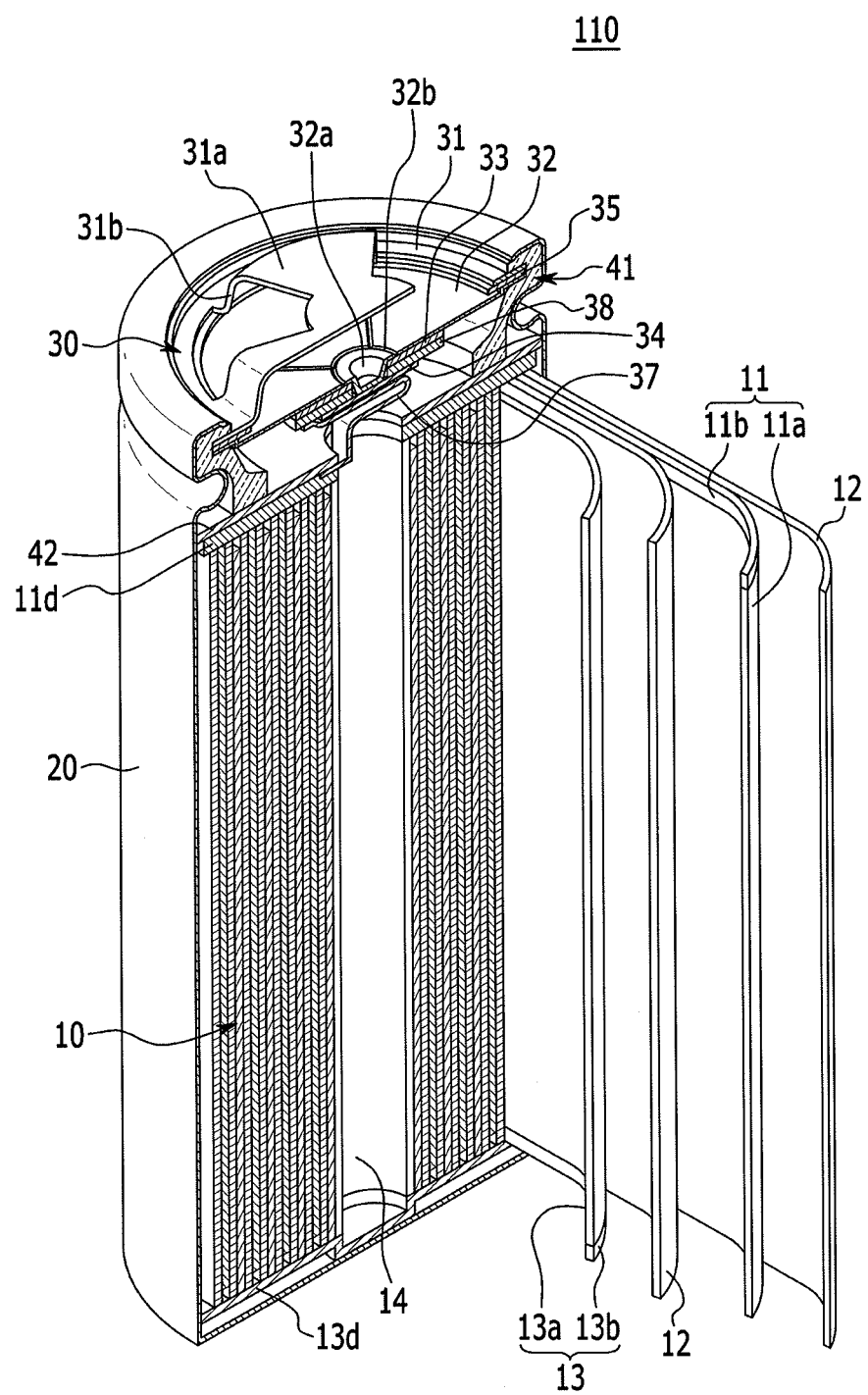
FIG. 3 illustrates a cross-sectional view of a rechargeable battery cell of FIG. 1.

FIG. 3 illustrates a cross-sectional view of a rechargeable battery cell 110 of FIG. 1. Referring to FIG. 3, the rechargeable battery cell 110 may be formed as a cylindrical rechargeable battery or as a square rechargeable battery (not shown). The rechargeable battery cell 110 may include an electrode assembly 10 performing charging and discharging, a case 20 in which the electrode assembly 10 is installed, and a cap assembly 30 coupled to the case 20 and electrically connected to the electrode assembly 10.

The electrode assembly 10 may include a positive electrode 11, a separator 12, and a negative electrode 13 that are sequentially layered. The electrode assembly 10 may be formed by winding the positive electrode 11, the negative electrode 13, and the separator 12, which may be an insulator disposed between the electrodes, in a jelly roll shape.

For example, the electrode assembly 10 may be formed in the shape of a cylinder. The cylindrical electrode assembly 10 may be provided with a sector pin 14 in a center thereof. The sector pin 14 may maintain the shape of the electrode assembly 10 to be a cylinder.

The positive electrode 11 and the negative electrode 13 may include coated regions 11a and 13a where an active material is coated to both sides of a current collector that is formed of a thin metal plate, and uncoated regions 11b and 13b where the active material is not coated to expose the current collector and which are set to opposite ends.

In the jelly roll state, a positive current collecting plate 11d may be connected to the uncoated region 11b of the positive electrode 11 of the electrode assembly 10, and a negative current collecting plate 13d may be connected to the uncoated region 13b of the negative electrode 13 of the electrode assembly 10.

The case 20 may include an opening in one side thereof for insertion of the electrode assembly 10 from the outside. The case may be formed in the shape of a cylinder to receive the cylindrical electrode assembly 10. The case 20 may be connected to the negative current collecting plate 13d to function as a negative terminal in the rechargeable battery, and may be formed of a conductive metal such as aluminum, an aluminum alloy, or nickel plated steel.

The cap assembly 30 may be coupled to the opening of the case 20 by providing a gasket 41 therebetween such that the cap assembly 30 is electrically insulated from the case 20. The cap assembly may close the case 20 that receives the electrode assembly 10 and an electrolyte solution, and may be electrically connected to the electrode assembly 10 through a current blocking device.

For example, the cap assembly 30 may include a cap plate 31, a positive temperature coefficient element (PTC) 35, a vent plate 32, an insulation member 33, a middle plate 38, and a sub-plate 34. These structures may be sequentially arranged toward the inside of the case 20 from the outside thereof.

The cap plate 31 is ultimately connected to the positive current collecting plate 11d and thus may function as a positive terminal in the rechargeable battery cell 110. The cap plate 31 may include a protrusion 31a protruding to the outside of the case 20 and an exhaust hole 31b opened in a side direction of the protrusion 31a to exhaust internal gas.

The current blocking device may include the vent plate 32, the sub-plate 34, and a connector thereof. The connector may be formed by connecting the vent plate 32 and the sub-plate 34 through welding.

The vent plate 32 forming one side of the current blocking device may be installed in an inner side of the cap plate 31, and thus, may be electrically connected to the sub-plate 34 that forms the other side of the current blocking device.

In addition, the vent plate 32 may include a vent 32a, and may be ruptured under a predetermined pressure condition to discharge internal gas to the outside and block the electrical connection with the sub-plate 34.

For example, the vent 32a may protrude toward an inner side of the case 20 from the vent plate 32. The vent plate 32 may be provided with a notch 32b that guides rupture of the bent 32a in the peripheral area of the vent 32a.

Thus, when an internal pressure of the case 20 is increased due to generation of internal gas, the notch 32b may be ruptured in advance to discharge the internal gas to the outside through the vent plate 32 and the exhaust hole 31b to thereby prevent or reduce the likelihood of explosion of the rechargeable battery cell.

In this case, when the connection portion of the vent plate 32 and the sub-plate 34 is separated due to the rupture of the vent 32a, the electrode assembly 10 and the cap plate 31 may be electrically separated from each other.

The PTC element 35 may be provided between the cap plate 31 and the vent plate 32 to control a current flow between the cap plate 31 and the vent plate 32 according to an internal temperature of the rechargeable battery cell.

When the internal temperature exceeds a predetermined temperature, electrical resistance of the PTC element 35 may increase to infinity. Accordingly, the PTC element 35 may block a charging current or a discharging current between the cap plate 31 and the vent plate 32.

The sub-plate 34 may face the vent plate 32, interposing the insulation member 33, and thus may be electrically connected to the vent 32a. The middle plate 38 may be disposed between the insulation member 33 and the sub-plate 34. The vent 32a may protrude through a plurality of through holes of the insulation member 33 and the middle plate 38, and thus, may be connected to the sub-plate 34.

The middle plate 38 may be electrically connected to the sub-plate 34 and the vent 32a. In addition, the middle plate 38 may be connected to a lead tab 37 by welding, and the lead tab 37 may be connected to the positive current collecting plate 11d by welding.

As a result, the positive current collecting plate 11d may be electrically connected to the cap plate 31 by sequentially passing through the lead tab 37, the middle plate 38, the sub-plate 34, the vent 32a, the vent plate 32, and the positive temperature coefficient element 35.

An insulation plate 42 may be disposed between the positive current collecting plate 11d and the sub-plate 34 to electrically insulate the positive current collecting plate 11d from the sub-plate 34 or the middle plate 38. The lead tab 37 may be connected to the positive current collecting plate 11d, may pass through the through hole of the insulation plate 42, and may be connected to the middle plate 38.

The cap assembly 30 may be inserted into the opening of the case 20 by provision of the gasket 41, and may be fixed to the opening of the case 20 through a crimping process to thus form the rechargeable battery cell 110.

Figure 4:
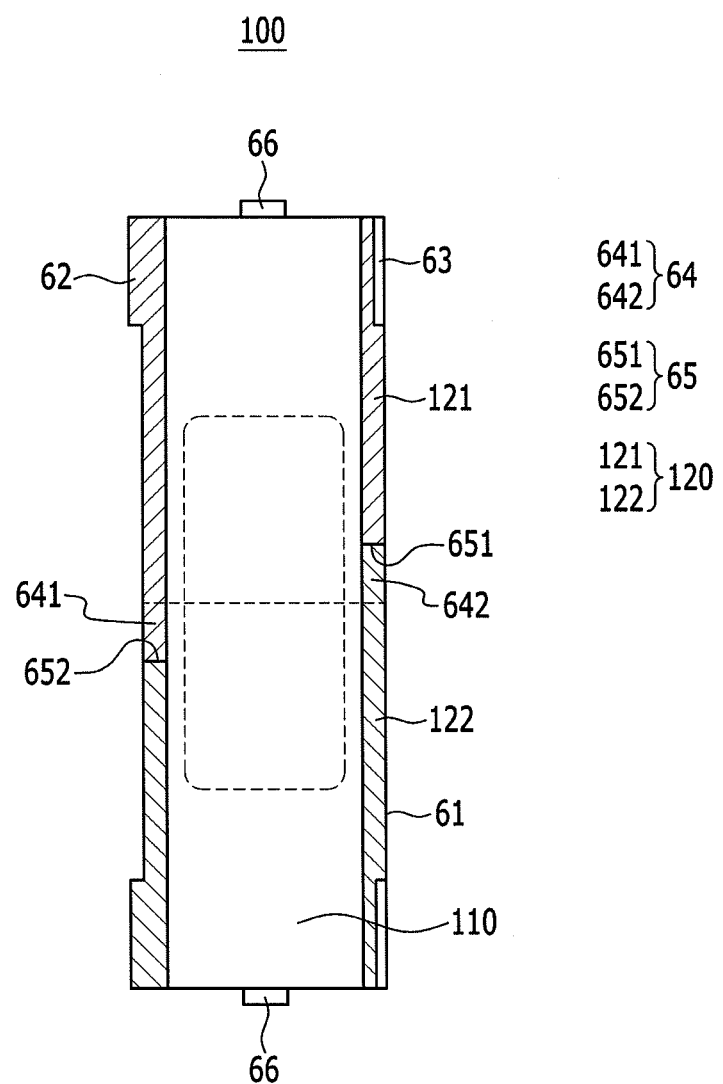
FIG. 4 illustrates a cross-sectional view with respect to a line IV-IV of FIG. 1.

FIG. 4 illustrates a cross-sectional view with respect to a line IV-IV of FIG. 1. Referring to FIG. 1, FIG. 2, and FIG. 4, the cell holder 120 of the rechargeable battery pack 100 may includes a base 61 for supporting the rechargeable battery cell 110, a combination protrusion 62 and a combination groove 63 symmetrically disposed on an outer side of the base 61, and a protrusion 64 and a recess portion 65 formed in a length direction of the base 61.

The rechargeable battery cell 110 may be a cylindrical rechargeable battery. Accordingly, the base 61 of the cell holder 120 may be formed to have a cylindrical shape corresponding to the shape of the cylindrical rechargeable battery cell 110. The cell holder 120 may include a heat dissipating hole 61a to cool the rechargeable battery cell 110. When the rechargeable battery cell is formed with a square-type rechargeable battery, the base of the cell holder may be formed to have a square shape corresponding to the square-type rechargeable battery cell (not shown).

The cell holder 120, including the protrusion 64 and the recess portion 65, receives a rechargeable battery cell 110 to form the rechargeable battery pack 100. The combination protrusion 62 and the combination groove 63 formed on the outer side of the base 61 connect a plurality of the rechargeable battery packs 100, each receiving a rechargeable battery cell 110, such that the rechargeable battery packs 100 may be mounted.

The protrusion 64 may be formed to protrude at one side of the base 61 in the length direction so that the protrusion 64 may be combined in the length direction of the base 61. The recess portion 65 may be formed to be concave in the base 61 in the length direction so that the recess portion 65 may be combined with the protrusion 64.

The cell holder 120 may include a support 66 at the opposite side of the protrusion 64 and the recess portion 65. The support 66 may protrude from an end of the base 61 so that the support 66 may correspond to an end of the rechargeable battery cell 110, to thus support an end of the rechargeable battery cell 110 in the length direction of the rechargeable battery pack 100.

When the protrusion 64 is combined with the recess portion 65, the support 66 provided at an end of the base 61 supports both ends of the rechargeable battery cell 110 so the cell holder 120 forms a rechargeable battery pack 100 for receiving one rechargeable battery cell 110.

The cell holder 120 in the rechargeable battery pack 100 may include a first cell holder 121 for receiving one side of the rechargeable battery cell 110 in the length direction, and a second cell holder 122 for receiving the other side of the rechargeable battery cell 110 in the length direction.

The first cell holder 121 may include a protrusion 641 and a recess portion 651 that are disposed to be symmetrical to each other. The second cell holder 122 may include a recess portion 652 and a protrusion 642 that are disposed to be symmetrical to each other, and are combinable with the protrusion 641 and the recess portion 651 of the first cell holder 121.

Configurations of the protrusion 641 and the recess portion 651 of the first cell holder 121 may correspond to those of the protrusion 642 and the recess portion 652 of the second cell holder 122. Therefore, the production cost of the cell holder 120 may be reduced because of the use of common parts.

Figure 5:
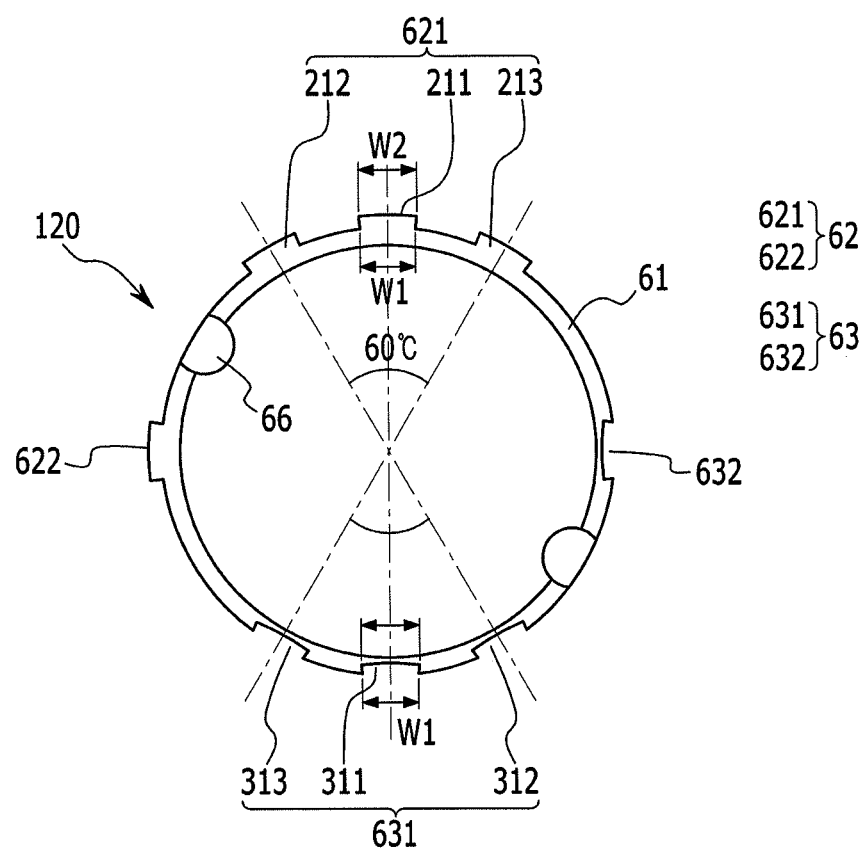
FIG. 5 illustrates a side view diagram of a cell holder of FIG. 1.
Figure 6:
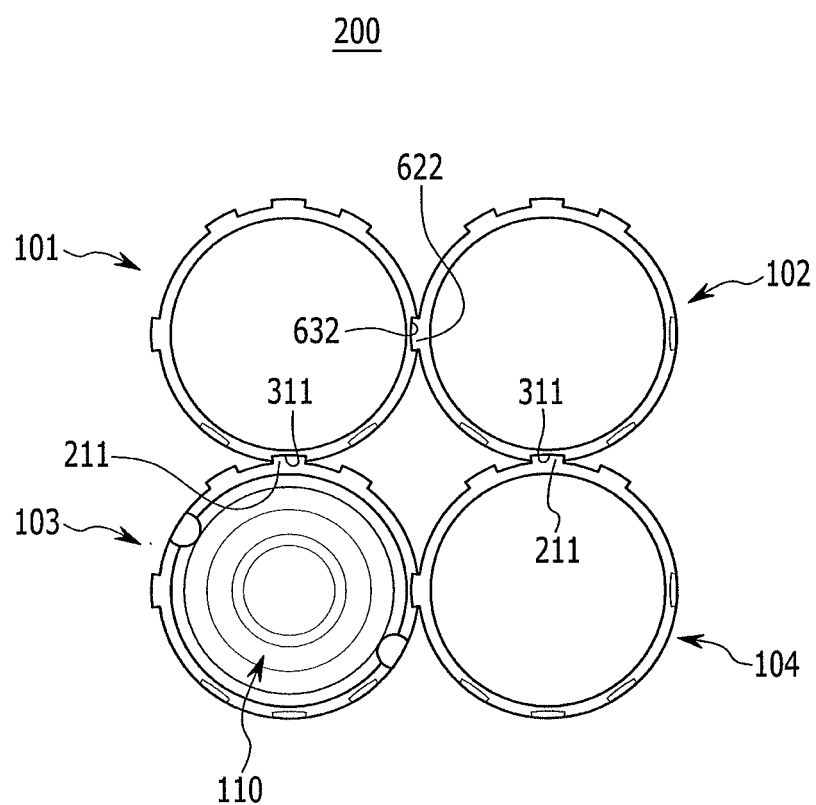
FIG. 6 and FIG. 7 illustrate side view diagrams when a rechargeable battery pack of FIG. 1 is mounted.
Figure 7:
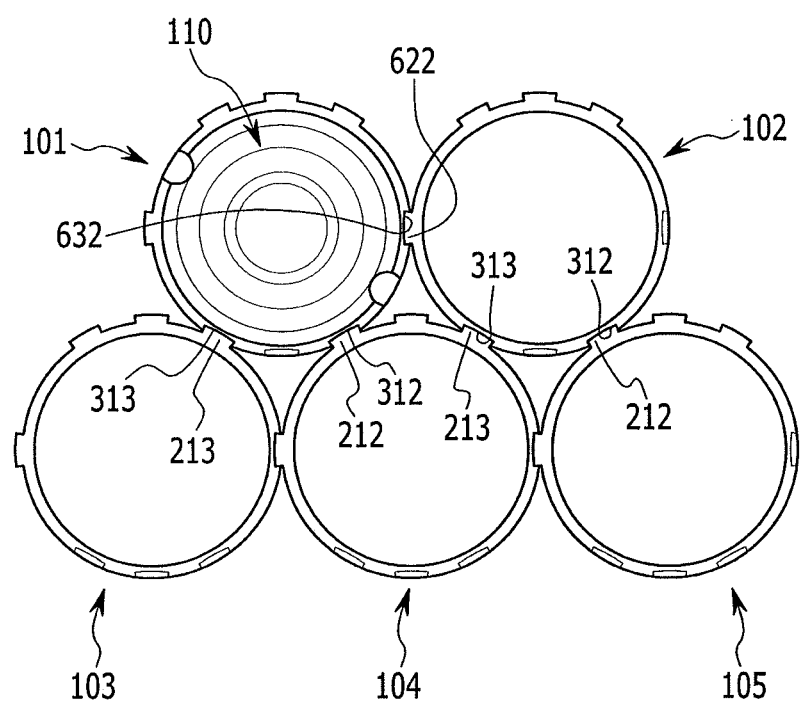

FIG. 5 illustrates a side view diagram of a cell holder 120 of FIG. 1. FIG. 6 and FIG. 7 illustrate side view diagrams when a rechargeable battery pack 200 of FIG. 1 is mounted. Referring to FIG. 6 to FIG. 7, the rechargeable battery pack 200 may include a plurality of rechargeable battery cells 110, and a plurality of cell holders 120 that receive the rechargeable battery cells 110. The cell holders 120 may be combined with each other on their outer sides. The rechargeable battery pack 200 of FIG. 6 is formed by connecting the rechargeable battery packs 100 (101, 102, 103, and 104) of FIG. 1.

In the cell holder 120, the combination protrusion 62 is formed at the base 61 with a first width W1. The combination protrusion 62 includes an end that is connected to an inclined surface and protrudes with a second width W2 that is greater than the first width W1. The combination groove 63 has a first width W1 at an outer surface of the base 61 to correspond to the combination protrusion 62. The combination groove 63 is connected to an inclined surface, and has the second width W2 formed inside the base 61. Therefore, the cell holders 120 of the rechargeable battery packs (100: 101, 102, 103, and 104) can be connected to each other by combination of a combination protrusion 62 and a corresponding combination groove 63.

The combination protrusion 62 may include a first combination protrusion 621 provided on one side of an outer surface of the base 61 and a second combination protrusion 622 disposed with a predetermined gap or spacing from the first combination protrusion 621. In this regard, the combination groove 63 may include a first combination groove 631 installed in the base 61 on the opposite side in a diameter direction from the first combination protrusion 621, and a second combination groove 632 installed in the base 61 on the opposite side in a diameter direction from the second combination protrusion 622.

A mounting configuration of the rechargeable battery pack 200 may be determined according to a spacing of the first and second combination protrusions 621 and 622 and a spacing of the corresponding first and second combination grooves 631 and 632.

For example, the rechargeable battery pack 200 may mount the individual rechargeable battery packs (100: 101, 102, 103, 104) horizontally and/or vertically.

One second combination protrusion 622 and multiple first combination protrusions 621 may be provided. Accordingly the spacing of the first and second combination protrusions 621 and 622 may be set in various ways. Similarly, one second combination groove 632 provided and multiple first combination grooves 631 may be provided. Accordingly, the spacing of the first and second combination grooves 631 and 632 may be set in various ways.

For example, the first combination protrusion 621 may include a primary first combination protrusion 211 disposed in the center, and a secondary first combination protrusion 212 and a tertiary first combination protrusion 213 on both sides at a 30-degree distance from the primary first combination protrusion 211. Therefore, the second combination protrusion 622 maintains a 90-degree spacing from the primary first combination protrusion 211, a 60-degree spacing from the secondary first combination protrusion 212, and a 120-degree spacing from with the tertiary first combination protrusion 213.

The first combination groove 631 may include a primary first combination groove 311 disposed in the center, and a secondary first combination groove 312 and a tertiary first combination groove 313 installed on both sides at a 30-degree distance from the primary first combination groove 311. Therefore, the second combination groove 632 maintains a 90-degree spacing from the primary first combination groove 311, a 60-degree spacing from the secondary first combination groove 312, and a 120-degree spacing from the tertiary first combination groove 313.

In the embodiment illustrated in FIG. 6, the top row is connected by combining the second combination groove 632 of the rechargeable battery pack 101 on the left and the second combination protrusion 622 of the rechargeable battery pack 102 on the right. The bottom row is connected by combining the second combination groove 632 of the rechargeable battery pack 103 on the left and the second combination protrusion 622 of the rechargeable battery pack 104 on the right.

The left column is connected by combining the primary first combination groove 311 of the rechargeable battery pack 101 on the top and the primary first combination protrusion 211 of the rechargeable battery pack 103 on the bottom. The right column is connected by combining the primary first combination groove 311 of the rechargeable battery pack 102 on the top and the primary first combination protrusion 211 of the rechargeable battery pack 104 on the bottom.

Therefore, the rechargeable battery pack 200 is formed by mounting the four rechargeable battery packs (101, 102, 103, 104), each including a rechargeable battery cell 110, and forming rows and columns in the horizontal and perpendicular direction. It is to be understood that larger rechargeable battery packs 200 may be obtained by connecting more individual rechargeable battery packs 100 in the same manner.

In the embodiment shown in FIG. 7, the top row is connected by connecting the second combination groove 632 of the rechargeable battery pack 101 on the left and the second combination protrusion 622 of the rechargeable battery pack 102 on the right. The bottom row is connected by combining the second combination groove 632 of the rechargeable battery pack 103 on the left and the second combination protrusion 622 of the rechargeable battery pack 104 in the middle, and by combining the second combination groove 632 of the rechargeable battery pack 104 in the middle and the second combination protrusion 622 of the rechargeable battery pack 105 on the right.

The right top oblique column on the left is connected by combining the tertiary first combination groove 313 of the rechargeable battery pack 101 at the top and the tertiary first combination protrusion 213 of the rechargeable battery pack 103 at the bottom. The right top oblique column on the right is connected by combining the tertiary first combination groove 313 of the rechargeable battery pack 102 at the top and the tertiary first combination protrusion 213 of the rechargeable battery pack 104 at the bottom.

The left top oblique column on the left is connected by combining the secondary first combination groove 312 of the rechargeable battery pack 101 at the top and the secondary first combination protrusion 212 of the rechargeable battery pack 104 at the bottom. The left top oblique column on the right is connected by combining the secondary first combination groove 312 of the rechargeable battery pack 102 at the top and the secondary first combination protrusion 212 of the rechargeable battery pack 105 at the bottom.

Therefore, the rechargeable battery pack 300 may formed by mounting the five rechargeable battery packs (101, 102, 103, 104, 105), each including a rechargeable battery cell 110, in an oblique direction. It is to be understood that larger rechargeable battery packs 200 may be obtained by connecting more individual rechargeable battery packs 100 in the same manner.

Various other exemplary embodiments will now be described.

Figure 8:
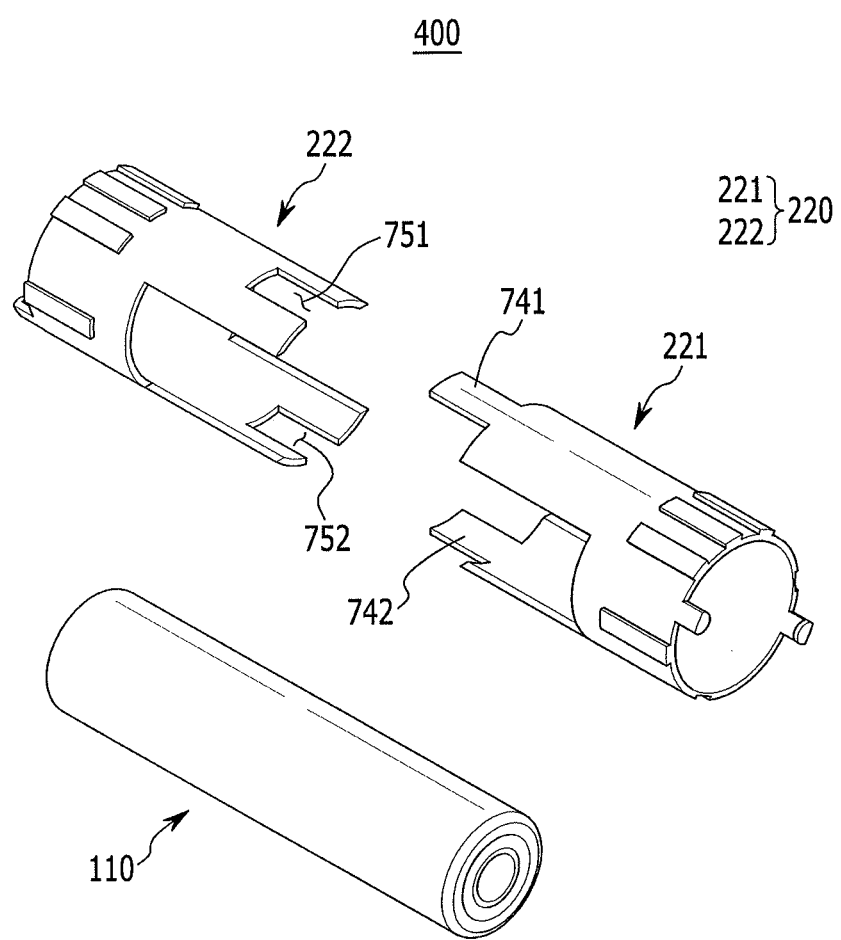
FIG. 8 illustrates an exploded perspective view of a rechargeable battery pack according to another exemplary embodiment.
Figure 9:
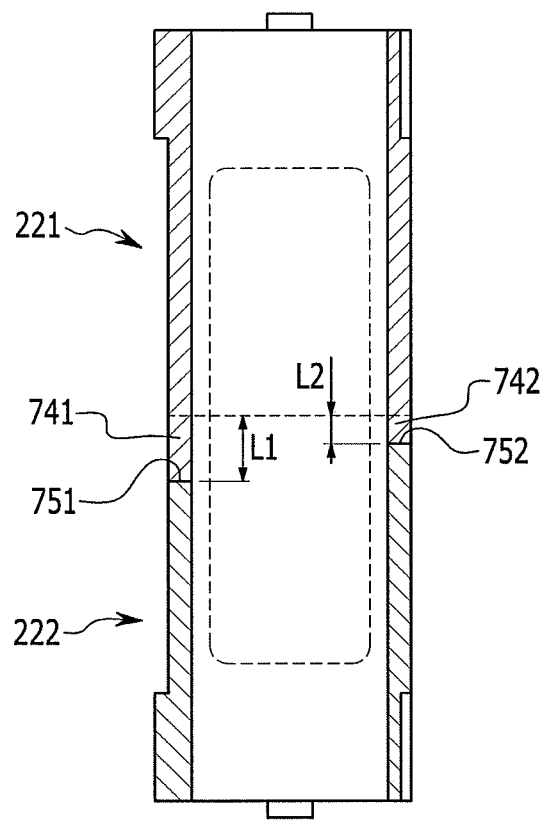
FIG. 9 illustrates a cross-sectional view of FIG. 8.

FIG. 8 illustrates an exploded perspective view of a rechargeable battery pack 400 according to another exemplary embodiment, and FIG. 9 illustrates a cross-sectional view of FIG. 8. Referring to FIG. 8 and FIG. 9, a cell holder 220 includes a first cell holder 221 and a second cell holder 222 that have different configurations from each other. The first cell holder 221 and the second cell holder 222 have directivity with respect to the negative electrode and the positive electrode of the rechargeable battery cell 110.

The first cell holder 221 includes a first protrusion 741 and a second protrusion 742 that are disposed to be symmetrical to each other. The second cell holder 222 includes a first recess portion 751 and a second recess portion 752 combinable to the first protrusion 741 and the second protrusion 742 that are disposed to be symmetrical to each other.

The first protrusion 741 and the first recess portion 751 correspond to each other and have a first length L1. The second protrusion 742 and the second recess portion 752 correspond to each other and have a second length L2 that is less than the first length L1.

Figure 10:
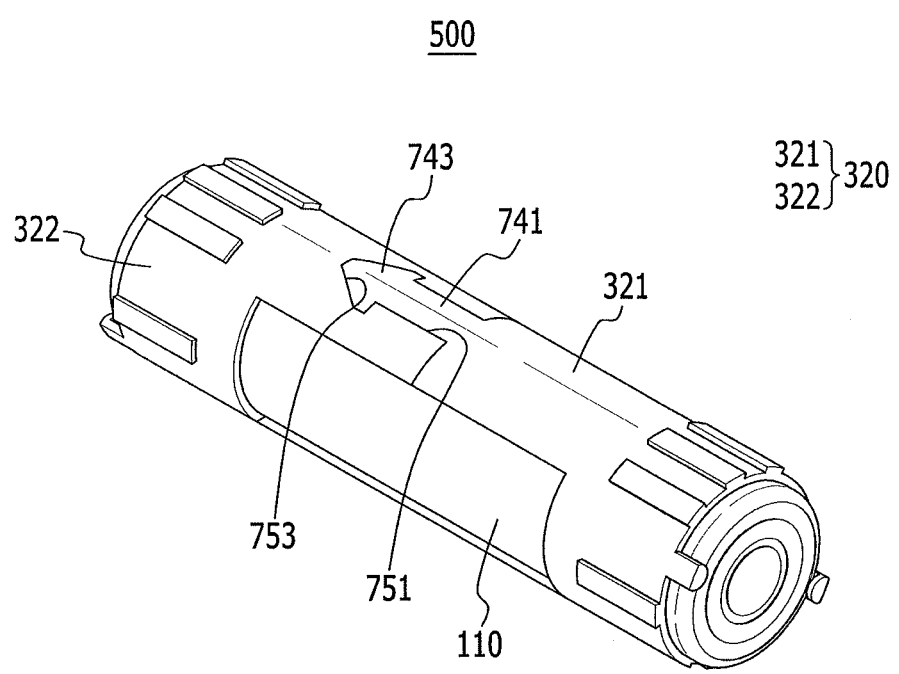
FIG. 10 illustrates a perspective view of a rechargeable battery pack according to another exemplary embodiment.
Figure 11:
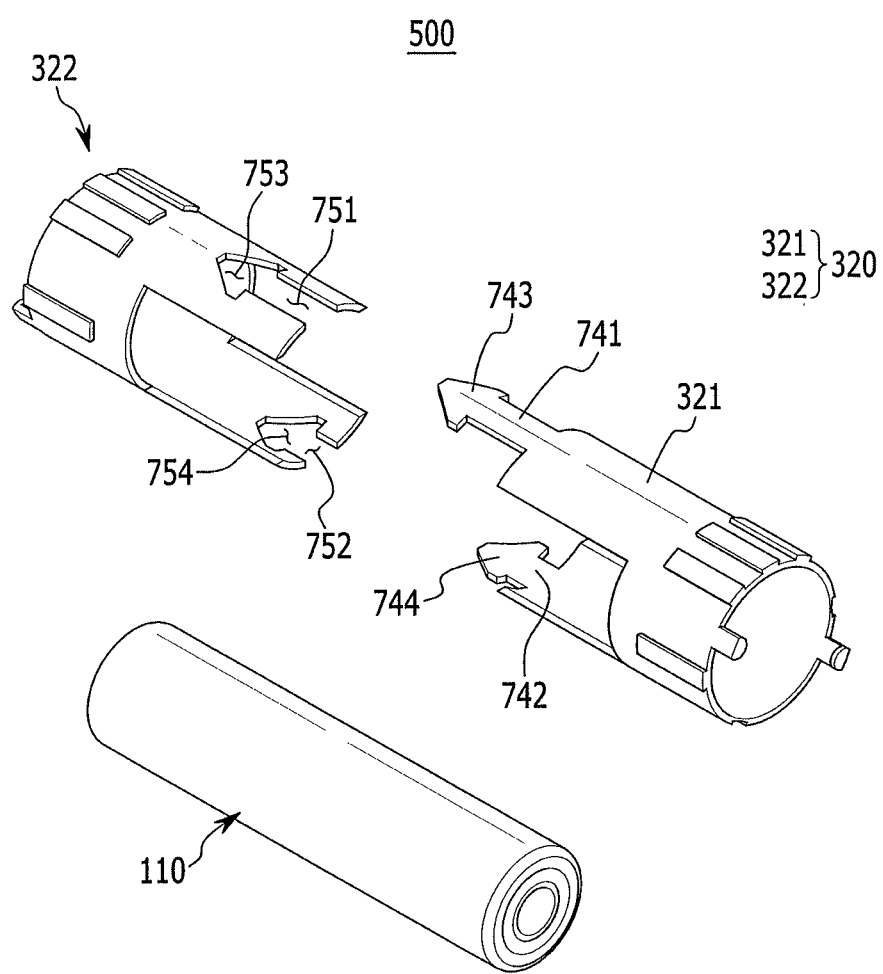
FIG. 11 illustrates an exploded perspective view of a rechargeable battery pack of FIG. 10.

FIG. 10 illustrates a perspective view of a rechargeable battery pack 500 according to another exemplary embodiment, and FIG. 11 illustrates an exploded perspective view of a rechargeable battery pack of FIG. 10. Referring to FIG. 10 and FIG. 11, the cell holder 320 includes a first cell holder 321 and a second cell holder 322.

The first and second protrusions 741 and 742 of the first cell holder 321 include hooks 743 and 744 that are protruded to cross the length direction. The first and second recess portions 751 and 752 of the second cell holder 322 include grooves 753 and 754 that are concave to cross the length direction.

The hooks 743 and 744 and the grooves 753 and 754 improve fastening of the first and second cell holders 321 and 322 combined by the first and second protrusions 741 and 742 and the first and second recess portions 751 and 752.

For convenience, the hooks 743 and 744 and the grooves 753 and 754 according to the this exemplary embodiment may be applied to the first and second cell holders 221 and 222 or to the first and second cell holders 121 and 122 according to the previous exemplary embodiments.

Figure 12:
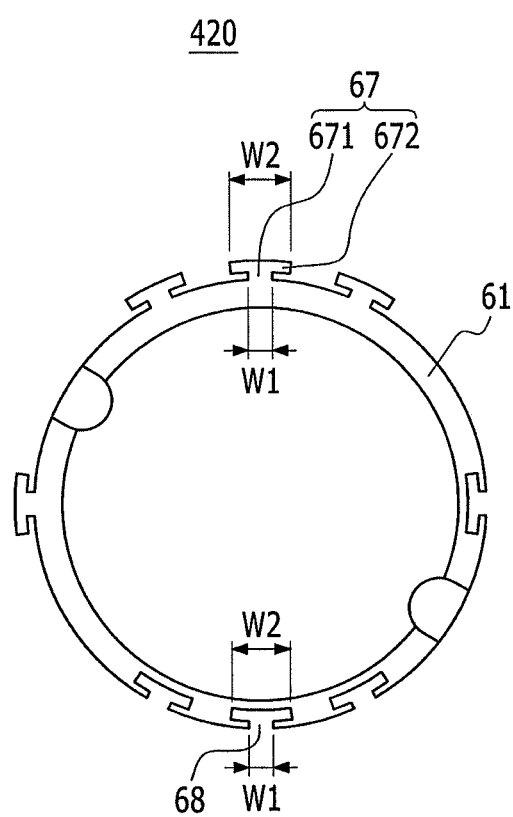
FIG. 12 illustrates a side view diagram of a cell holder used for a rechargeable battery pack according to another exemplary embodiment.

FIG. 12 illustrates a side view diagram of a cell holder 420 used for a rechargeable battery pack according to another exemplary embodiment. Referring to FIG. 12, a combination protrusion 67 includes a connector 671 that protrudes from the base 61, the connector 671 having with a first width W1 and an extension 672 formed at the end of the connector 671, the extension having a second width W2 that is greater than the first width W1.

A combination groove 68 is formed to have the first width W1 at the surface of the base to correspond to the connector 671. The combination groove 68 extends inside of the base 61 to have the second width W2 to correspond to the extension 672.

Although not shown, the extension 672 of the combination protrusion 67 of the cell holder 420 in the rechargeable battery pack is combinable with the combination groove 68 of the cell holder 420 of another rechargeable battery pack to improve the fastening of the rechargeable battery pack.

Figure 13:
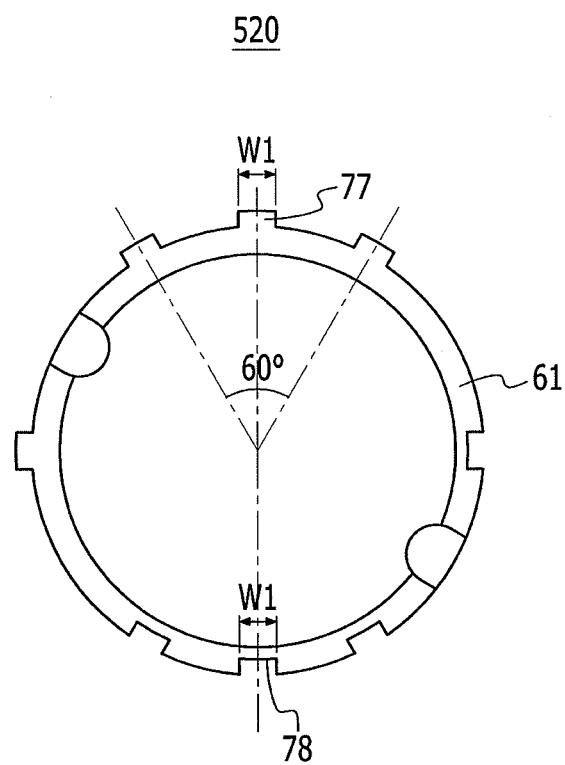
FIG. 13 illustrates a side view diagram of a cell holder used for a rechargeable battery pack according to another exemplary embodiment.

FIG. 13 shows a side view diagram of a cell holder 520 used for a rechargeable battery pack according to another exemplary embodiment. Referring to FIG. 13, a combination protrusion 77 is formed to protrude from the base 61 with the first width W1. A combination groove 78 is formed at the end of the base 61 with the first width W1 to correspond to the combination protrusion 77.

Although not shown, the combination protrusion 77 of the cell holder 520 in the rechargeable battery pack may be combined with the combination groove 78 of the cell holder 520 of another rechargeable battery pack to form the rechargeable battery pack.

Figure 14:
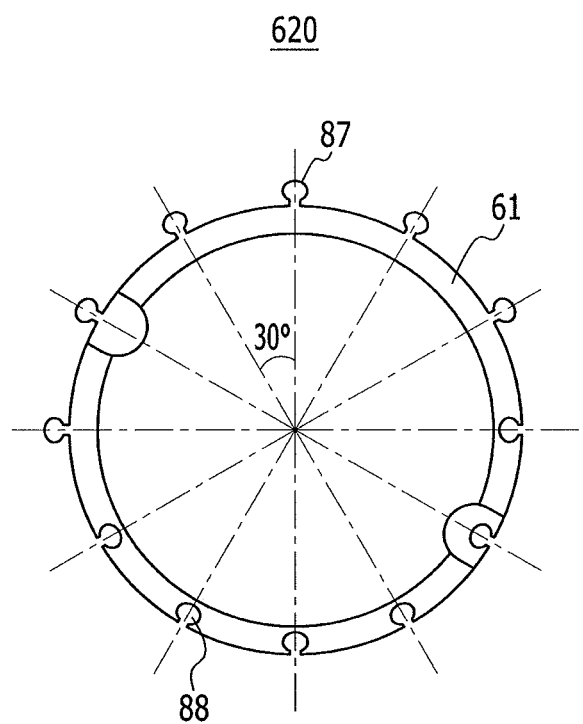
FIG. 14 illustrates a side view diagram of a cell holder used for a rechargeable battery pack according to another exemplary embodiment.

FIG. 14 shows a side view diagram of a cell holder 620 used for a rechargeable battery pack according to another exemplary embodiment. Referring to FIG. 14, a plurality of combination protrusions 87 are formed at regular intervals on half the range of the circumference of the base 61. A plurality of combination grooves 88 that are symmetrical with the combination protrusions 87 are formed with regular intervals therebetween on the other half of the range of the circumference of the base 61.

The combination protrusion 87 includes a connector 871 that protrudes from the base 61, and an extension 872 formed at the end of the connector 871 to be larger than the connector 871. The combination groove 88 is formed at the end of the base 61 to correspond to the combination protrusion 87.

Six combination protrusions 87 may be formed at 30-degree intervals within half the range of the circumference of the base 61, and six combination grooves 88 may be formed at 30-degree intervals within the other half of the range of the circumference of the base 61.

Although not shown, the extension 872 of the combination protrusion 87 of the cell holder 620 in the rechargeable battery pack may be combinable with the combination groove 88 of the cell holder 620 in another rechargeable battery pack to improve the fastening of the rechargeable battery pack.

By way of summation and review, a rechargeable battery pack may include a plurality of cells configured with rechargeable batteries, and a cell holder including the cells. For example, the cell holder may be configured with various sizes and structures according to the number of cells. Generally, the cell holder is separately designed according to the number of cells, and it may require a long time to mount the cells on such a cell holder.

In contrast, embodiments provide a rechargeable battery pack having a cell holder for mounting a plurality of rechargeable battery cells with various configurations. The rechargeable battery includes a combination protrusion and the combination groove on the base surface of the cell holder such that a plurality of rechargeable battery cells may be mounted with various structures and in various configurations.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:
1. A rechargeable battery pack, comprising:
a plurality of rechargeable battery cells; and
a plurality of cell holders for receiving the rechargeable battery cells, the cell holders being combinable with each other on an outer side thereof, wherein
each of the cell holders includes:
a base for supporting one of the rechargeable battery cells, and
a combining protrusion and a combining groove symmetrically disposed on an outer side of the base, the combining protrusion extending outwardly from the outer side of the base and the combining groove extending inwardly from the outer side of the base,
the combining protrusion including:
a first combining protrusion at one side of the base, the first combining protrusion including a primary first combining protrusion, and a secondary first combining protrusion and a tertiary first combining protrusion on respective sides in a 30-degree direction from the primary first combining protrusion such that the primary first combining protrusion is centered between the secondary first combining protrusion and the tertiary first combining protrusion, and
a second combining protrusion spaced apart from the primary first combining protrusion in a 90-degree direction from the primary first combining protrusion, and
the combining groove including:
a first combining groove at an opposite side of the base, the first combining groove including a primary first combining groove and a secondary first combining groove and a tertiary first combining groove on respective sides in a 90-degree direction from the primary first combining groove such that the primary first combining groove is centered between the secondary first combining groove and the tertiary first combining groove, and
A second combining groove spaced apart from the primary first combining groove in a 90-degree direction from the primary first combining groove, wherein the base of each of the cell holders is in a form of a cylinder, and the 30-degree direction and the 90-degree direction from the primary first combining protrusion and the 30-degree direction and the 90-degree direction from the primary first combining groove are with respect to a central axis of the cylinder.

2. The rechargeable battery pack as claimed in claim 1, wherein the one rechargeable battery cell is a cylindrical rechargeable battery, and the base of each of the cell holders in the form of the cylinder corresponds to the cylindrical rechargeable battery.

3. The rechargeable battery pack as claimed in claim 1, wherein
the combining protrusion has a first width at a surface of the base and includes an inclined surface such that a protruded end of the combining protrusion has a second width that is greater than the first width.

4. The rechargeable battery pack as claimed in claim 3, wherein
the combining groove has a first width at the surface of the base, the first width of the combining groove corresponding to the first width of the combining protrusion, and includes an inclined surface such that the combining groove has a second width inside the base, the second width of the combining groove corresponding to the second width of the combining protrusion.

5. The rechargeable battery pack as claimed in claim 1, wherein
the combining protrusion includes:
a connector that protrudes from the base, the connector having a first width; and
an extension at an end of the connector, the extension having a second width that is greater than the first width.

6. The rechargeable battery pack as claimed in claim 5, wherein
the combining groove has the first width at a surface of the base to correspond to the connector, and has the second width inside the base to correspond to the extension.

7. The rechargeable battery pack as claimed in claim 1, wherein
the combining protrusion protrudes from the base with a first width, and
the combining groove is formed into an outer surface of the base with the first width to correspond to the combining protrusion.

8. The rechargeable battery pack as claimed in claim 2, wherein, with respect to each of the cell holders:
the combining protrusion includes a plurality of combining protrusions at regular intervals on one half of a circumference of the base, and
the combining groove includes a plurality of combining grooves symmetrically located with respect to the combining protrusions at regular intervals on another half of the circumference of the base, the combining grooves being absent from the half of the circumference of the base having the combining protrusions at regular intervals, and the combining protrusions being absent from the other half of the circumference of the base having the combining grooves.

* * * * *